United States Patent
Singh

(10) Patent No.: US 12,248,594 B2
(45) Date of Patent: Mar. 11, 2025

(54) PARSING A DIRECTORY TREE TO TRANSLATE PERMISSIONS

(71) Applicant: Dell Products L.P., Round Rock, TX (US)

(72) Inventor: Akash Singh, Pune (IN)

(73) Assignee: DELL PRODUCTS L.P., Round Rock, TX (US)

( * ) Notice: Subject to any disclaimer, the term of this patent is extended or adjusted under 35 U.S.C. 154(b) by 122 days.

(21) Appl. No.: 18/185,712

(22) Filed: Mar. 17, 2023

(65) Prior Publication Data

US 2024/0311499 A1    Sep. 19, 2024

(51) Int. Cl.
G06F 16/00    (2019.01)
G06F 16/22    (2019.01)
G06F 21/62    (2013.01)

(52) U.S. Cl.
CPC .......... *G06F 21/6218* (2013.01); *G06F 16/22* (2019.01)

(58) Field of Classification Search
None
See application file for complete search history.

(56) References Cited

U.S. PATENT DOCUMENTS

| | | | |
|---|---|---|---|
| 12,039,066 B1 * | 7/2024 | Sharma | G06F 21/6218 |
| 2016/0162370 A1 * | 6/2016 | Mehta | G06F 16/162 |
| | | | 707/610 |
| 2021/0165759 A1 * | 6/2021 | Bar-Nissan | G06F 16/119 |

\* cited by examiner

*Primary Examiner* — Thu Nguyet T Le
(74) *Attorney, Agent, or Firm* — Amin, Turocy & Watson, LLP

(57) ABSTRACT

Architectures and techniques are described that can translate permissions from a first storage system to a second storage system. Such can be applied during a data migration operation that migrate storage data from the first storage system to the second storage system. A directory tree structure of the storage data can be explored to identify one or more target directories that can be used to leverage an inheritance property. Permissions can be translated based on the identification of the target directories.

20 Claims, 11 Drawing Sheets

PARSING A DIRECTORY TREE TO TRANSLATE PERMISSIONS

BACKGROUND

Today, many services leverage or rely on data storage and data storage itself is commonly provided as a service. One central aspect of data storage is security, which is typically handled by authenticators that regulate permissions to access the data. Over time, permissioning protocols may change or evolve, which can lead to large scale data migration operations that migrate the data from a legacy platform to a more modern platform. An important objective of any such migration operation is that both security and accessibility of the data is maintained.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1A:
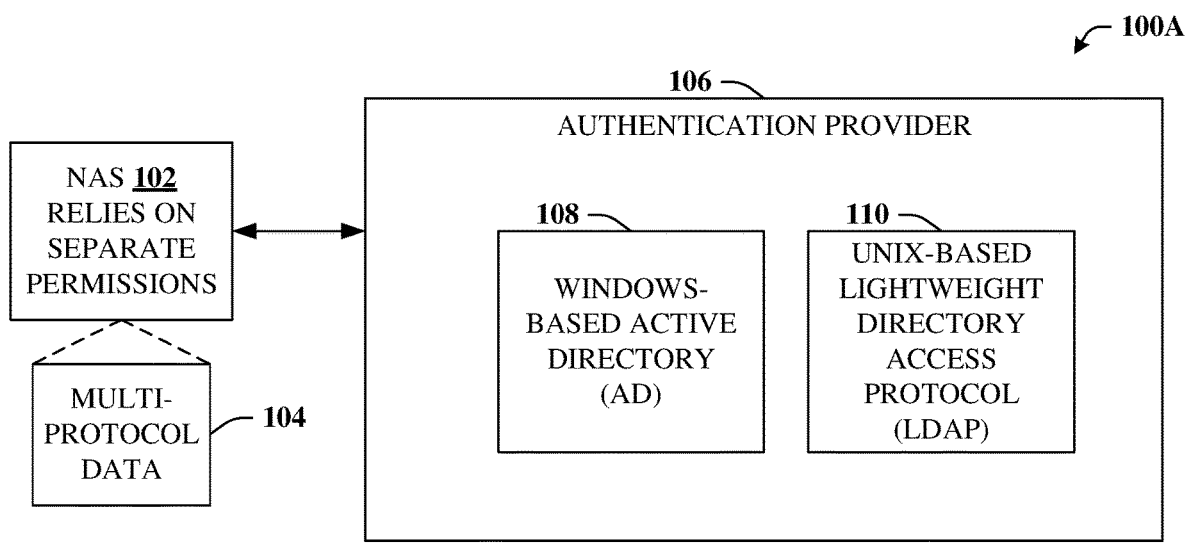
FIG. 1A depicts a schematic block diagram 100A illustrating a first example NAS 102 in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Figure 1B:
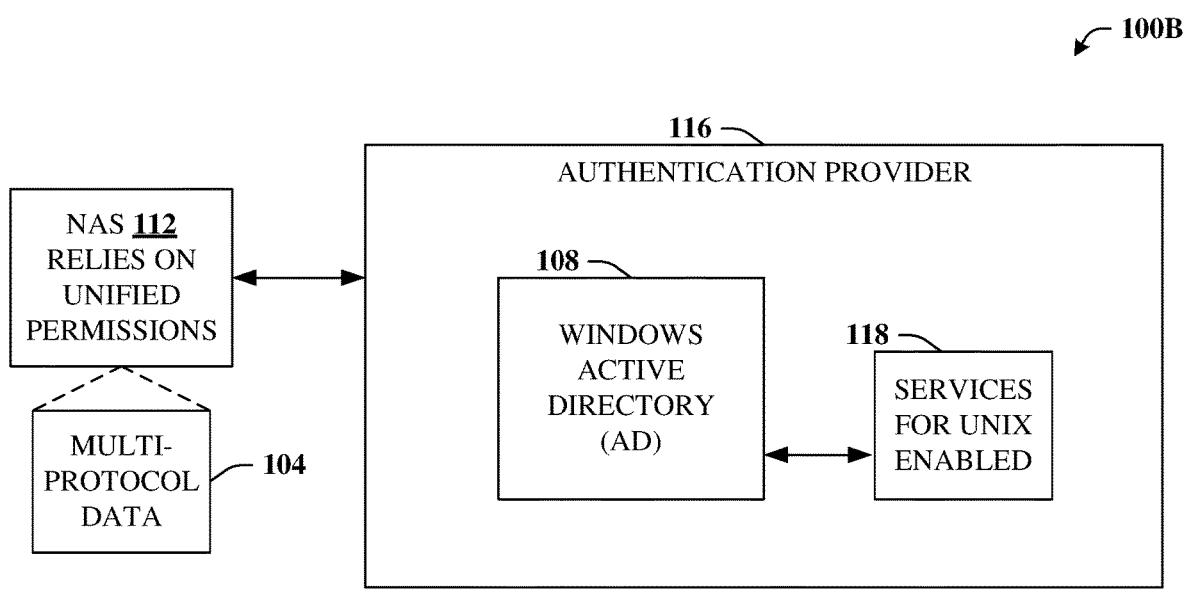
FIG. 1B depicts a schematic block diagram 100B illustrating a second example NAS 112 in accordance with certain embodiments of this disclosure.

In order to better describe the disclosed subject matter, it can be instructive to consider two example network attached storage (NAS) platforms, which are illustrated in connection with FIGS. 1A and 1B. FIG. 1A depicts a schematic block diagram 100A illustrating a first example NAS 102 in accordance with certain embodiments of this disclosure. FIG. 1B depicts a schematic block diagram 100B illustrating a second example NAS 112 in accordance with certain embodiments of this disclosure.

NAS 102 and NAS 112 can both include multiprotocol data 104. Multiprotocol data 104 represents data that can be accessed by multiple operating system platforms, such as, e.g., both Windows-type operating systems and Unix-type operating systems. In other words, a user can access his or her own data regardless of operating system platform by which that user interfaces the network attached storage (e.g., NAS 102 or NAS 112).

NAS 102 relies on separate permissions, as illustrated by authentication provider 106. For example, if a user logs in via a Windows-type operating system, then Windows-based Active Directory (AD) 108 can be used to authenticate and/or manage permissions for that user. On the other hand, if the user logs in via a Unix-type operating system, then Unix-based lightweight directory access protocol (LDAP) can be used to authenticate and/or manage permissions for the user.

In contrast, NAS 112 relies on a unified permissions scheme, as illustrated by authentication provider 116. Here, AD 108 can operate as the unified authentication mechanism. Thus, all Windows-based access is natively handled by AD 108. In the case of Unix-based access, AD 108 can derive the correct permissions via services 118 for Unix being enabled.

Many NAS systems today are structured similar to NAS 102 that authenticate and store file permissions separately. However, because AD 108 is generally considered to provide significantly more robust authentication services, AD 108 is the most widely used authenticator. Many modern NAS systems are moving to the unified authentication scheme illustrated by NAS 112. Thus, migrating data from one platform (e.g., generally from a platform like NAS 102 that relies on separate permissions) to the other (e.g., generally to a platform like NAS 112 that relies on a unified permissions structure) is becoming increasingly common.

Figure 2:
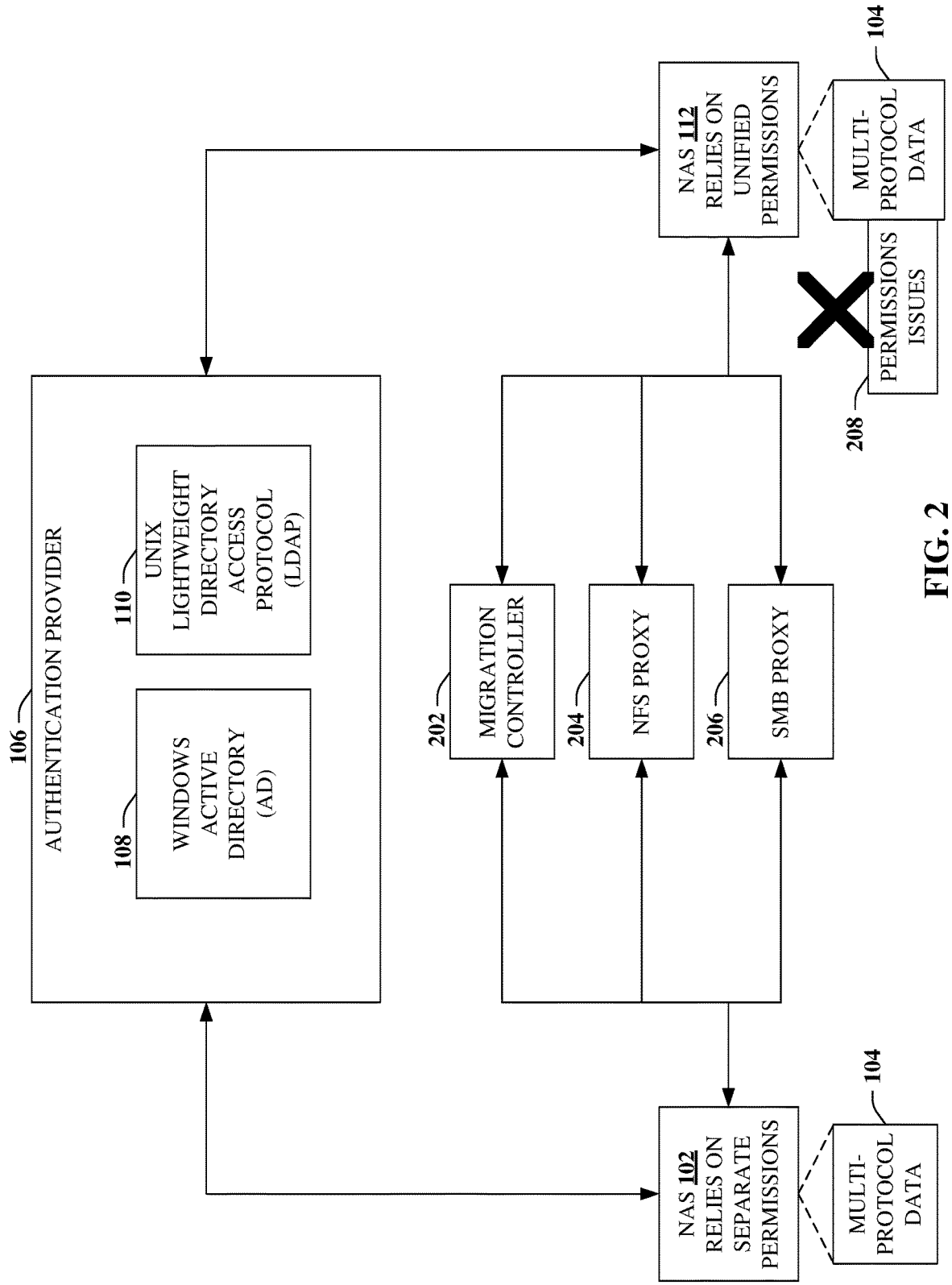
FIG. 2 depicts a schematic block diagram illustrating an example data migration in accordance with certain embodiments of this disclosure.

With reference now to FIG. 2, schematic block diagram 200 illustrating an example data migration in accordance with certain embodiments of this disclosure. Specifically, data stored to clusters of NAS 102, which relies on separate permissions, is being migrated to more modern clusters of NAS 112, which relies on a unified permissions model.

In a standard migration operation, migration controller 202 manages the migration from one platform to the other. Migration controller 202 relies on a network file system (NFS) proxy 204 and server message block (SMB) proxy 206. NFS protocols are generally associated with Unix-type operating systems, while SMB is the standard protocol for Windows-type operating systems. Relying on migration controller 202, NFS proxy 204 and SMB proxy 206, data is migrated using NFS along with NFS permissions. SMB permissions are migrated and added to the data. A unified NAS system such as NAS 112 either retains NFS permissions or SMB permissions and derives the other. In the remainder of this disclosure, examples are provided in the context of retaining SMB permissions and deriving NFS permissions.

Certain tools exist to facilitate this migration, but these tools have proved to be unreliable in some cases, resulting in permissions issues 208. For example, in the case in which a given file of the data being migrated has different owners on NFS protocols than for SMB protocols, the permissions applied after migration is often incorrect.

It is noted that in NFS or Unix-type operating systems, a given file (or other element) can have owner and group in the form of two distinct identifiers, namely a user identifier (UID) and a group identifier (GID). File permissions might also specify a portable operating system interface (posix) value or identifier. For SMB or Windows-type operating systems, a security identifier (SID) operates as the counterpart for both UID and GID and an access control list (ACL) operates as a counterpart to the posix ID.

One example permissions issue 208 is that certain migration tools may correctly translate a UID to an SID, but incorrectly translate the GID, such as assigning the SID to "everyone", which can lead to severe security problems because the translation results additional permissions. Another example permissions issue 208 is that following the migrations certain newly created files or directories may not be assigned the proper permissions. It is believed that this permissions issue 208 stems from the concept of inheritance that is integral to permissions for Windows-based operating systems in a way that does not exist for Unix-based operating systems.

The subject matter disclosed herein can remedy or mitigate permissions issues 208 or other issues that result when migrating data from a first storage system that relies on separate permission (e.g., NFS and SMB permissions stored separately) to a second storage system that relies on unified permissions (e.g., only a single authenticator). Additionally, the disclosed techniques can be used when migrating data from a first storage system accessed via a first protocol (e.g., NFS or Unix-type operating systems) to a second storage system accessed via a second protocol (e.g., SMB or Windows-type operating systems).

A possible naïve approach can be to convert all UIDs and GIDs (used by NFS) to respective SIDs (used by SMB) and to convert all posix IDs to respective ACLs and then to apply permissions on a file by file or directory by directory manner. However, such can lead to one or more permissions issues 208 detailed herein, as such a technique ignores the concept of inheritance applied by Windows-type operating systems on the translated permissions.

The disclosed techniques, inter alia, involve exploring a directory tree structure of the source data. In this way, the translation can attempt to visualize the Unix-type permission structure from the perspective of a Window-type structure of inheritance and then apply procedures to translate permissions in a manner that is consistent with Windows-type structures. Such translation can be performed efficiently and can avoid scenarios in which a file is assigned more permissions than is justified or when subsequent newly created files or directories do not receive the proper permissions. For example, by exploring and/or appropriately parsing the directory tree structure, target directories can be identified where inheritable permissions can be applied. Therefore, correct permissions can be applied to all files and subdirectories of the target directory.

Example Systems

Figure 3:
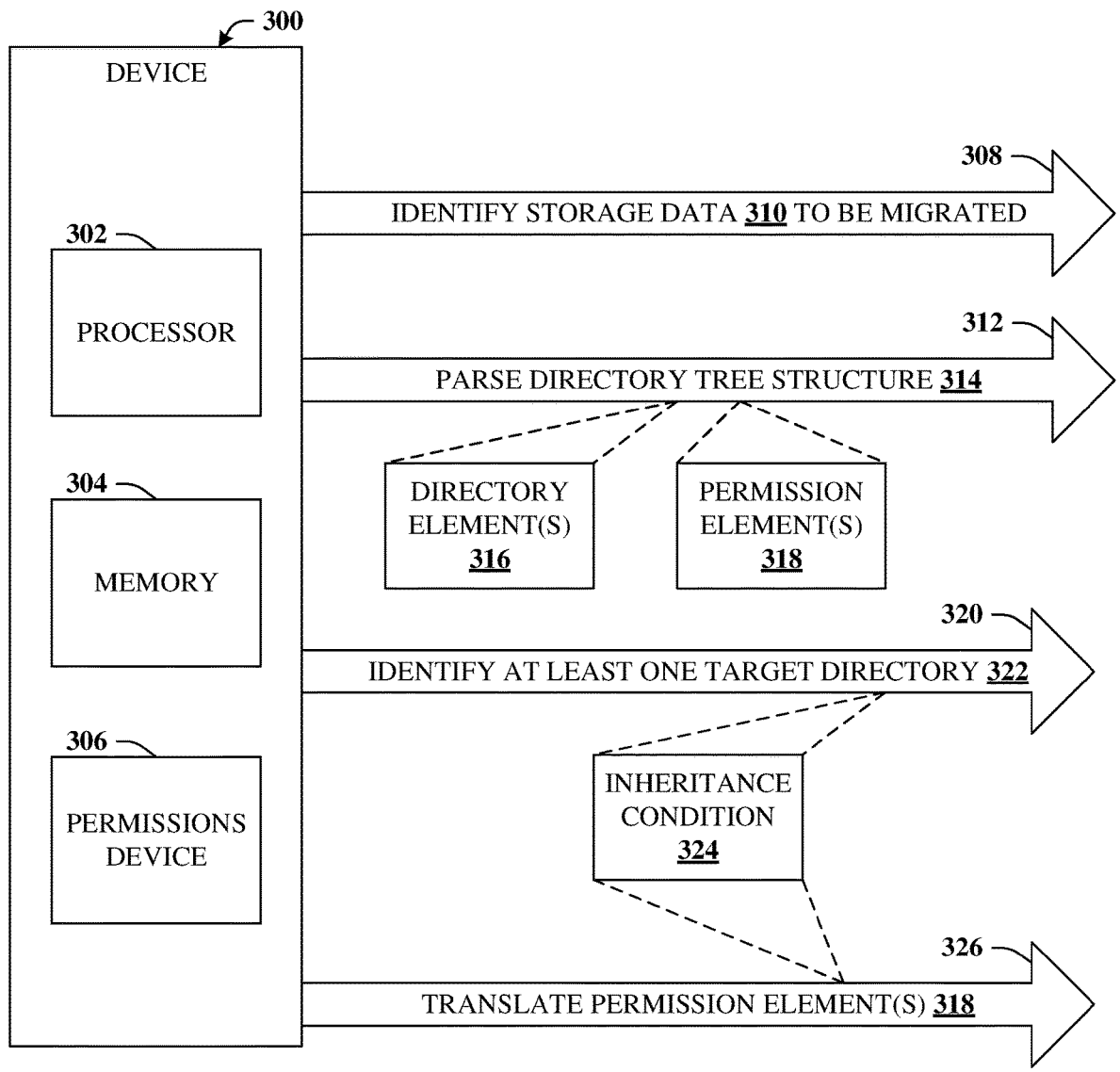
FIG. 3 depicts a schematic block diagram illustrating an example device 300 that can migrate permissions from one storage system to another in accordance with certain embodiments of this disclosure.

Referring now to FIG. 3, a schematic block diagram is depicted illustrating an example device 300 that can migrate permissions from one storage system to another in accordance with certain embodiments of this disclosure. Device 300 can comprise a processor 302 that can be specifically configured to perform function associated with assigning, updating, or migrating permissions. Device 300 can also comprise memory 304 that stores executable instructions that, when executed by processor 302, can facilitate performance of operations. Processor 302 can be a hardware processor having structural elements known to exist in connection with processing units or circuits, with various operations of processor 302 being represented by functional elements shown in the drawings herein that can require special-purpose instructions, for example, stored in memory 304 and/or configuration device 306. Along with these special-purpose instructions, processor 302 and/or permissions device 306 can be a special-purpose device. Further examples of the memory 304 and processor 302 can be found with reference to FIG. 11. It is to be appreciated that device 300 or computer 1102 can represent a server device or a client device of a network or network services platform and can be used in connection with implementing one or more of the systems, devices, or components shown and described in connection with FIG. 3 and other figures disclosed herein.

At reference numeral 308, device 300 can identify storage data 310 to be migrated. In practice storage data 310 can represent any suitable data that is be migrated from a first storage system to a second storage system. In some embodiments, the first storage system can be one that is assigned permissions that can be employed to determine access to storage data 310 and which can be managed in accordance with a first operating system such as, e.g., a Unix-type operating system and/or an operating system that utilizes NFS protocols. In some embodiments, the second storage system can be one that is assigned permissions that can be employed to determine access to storage data 310 and which can be managed in accordance with a second operating system that differs from the first operating system such as, e.g., a Windows-type operating system and/or an operating system that utilizes SMB protocols.

In other embodiments, the first storage system can be one that manages first permissions separately based on different operating system protocols such as having separate data and/or interfacing with separate authenticators depending on the client operating system. The second file storage system can be one that manages permissions according to a unified process such as maintaining a single set of permissions data with a single authenticator that has services enabled for the other, such as AD.

As illustrated at reference numeral 312, device 300 can parse directory tree structure 314. Directory tree structure 314 can represent a file system structure of storage data 310 (e.g., the data to be migrated, which can be all or a portion of a given NAS system). As part of this parsing, directory elements 316 and permission elements 318 can be identified. For example, each directory element 316 can have a corresponding permissions element 318.

Generally, directory elements 316 can be any element that is referenced by a path that including a directory such as a subdirectory or a file. In some embodiments, directory elements 316 can be a root directory, a parent directory, a child directory, or a file. Permission elements 318 can be any element specifies permissions to an associated directory element 316, such as a posix ID, a UID, a GID, or the like for a given directory or file.

At reference numeral 320, device 300 can identify at least one target directory 322 in response to inheritance condition 324 being satisfied. For example, device 300 can determine that a given directory element 316 is a target directory 322 in response to a determination that target directory 322 meets a certain criterion in connection with inheritance condition 324, which is also referred to herein as condition 324. More specifically, condition 324 can be satisfied if the permission element 318 corresponding to target directory 322 (and/or the particular directory element 316 that is being tested) is determined to be the same as each other permission element 318 corresponding to each other directory element 316 that is a child of target directory 322.

In other words, the target directory 322 can be a parent directory in which all of its child elements (e.g., subdirectories, files, . . . ) have identical permissions elements 318. In some embodiments, target directory 322 can be a topmost directory, within directory tree structure 314, in which condition 324 is satisfied. For example, suppose directory element 316 is a directory whose path is: /root/A and further suppose that /root/A has several child elements, where child elements are defined as any other directory element 316 (e.g., file or directory) that has /root/A in its path. /root/A can include files and subdirectories such as /root/A/a1, /root/A/a1/b1, and so on. If permission element(s) 318 for /root differs from that of /root/A, but permission elements 318 for all child elements of /root/A are the same, then /root/A is the particularly directory element 316 that is the top-most element to satisfy condition 324. It is noted that, in this example, /root/A/a1 and /root/A/a1/b1 both also satisfy condition 324, but are not the top-most directory. Hence, in some embodiments, condition 324 can further include a condition that target directory 324 is a top-most directory.

Identification of target directory(ies) 322 can allow the property of inheritance utilized by Windows-type permissioning to be effectively leveraged. For instance, at reference numeral 326, device 300 can translate permission element(s) 318. Such can be based on condition 324 and/or be implemented for target directory 322 and associated child elements. For example, the particular posix ID associated with target directory 322 can be translated to a suitable ACL and a UID and/or a GID associated with target directory 322 can be translated to respective SIDs. The translated permissions can be applied to target directory 322 as well as all child elements, including all child files or directories.

Figure 4:
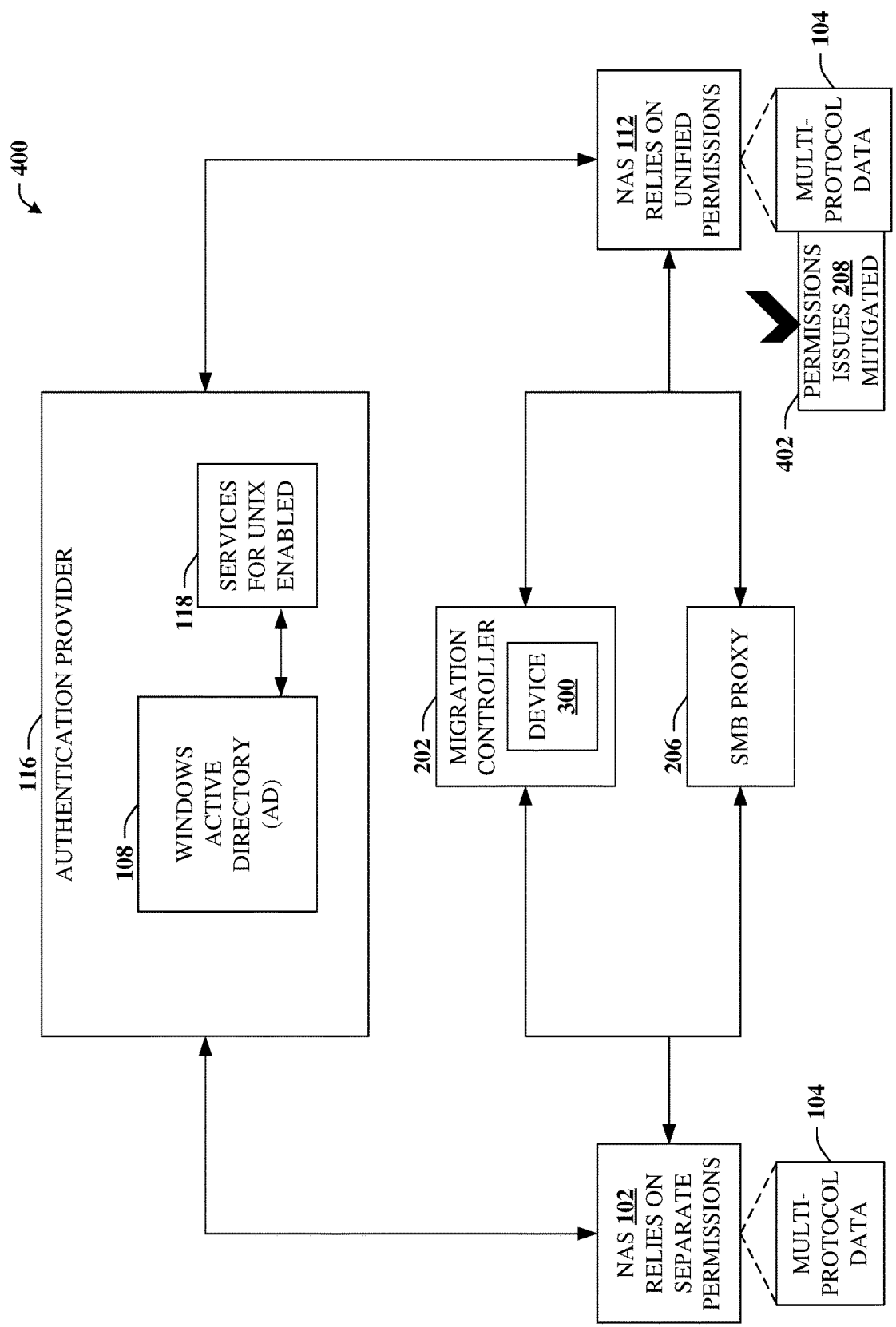
FIG. 4 illustrates schematic block diagram 400 depicting an example data migration utilizing certain disclosed techniques in accordance with certain embodiments of this disclosure.

Turning now to FIG. 4, block diagram 400 is presented. Block diagram 400 depicts an example data migration utilizing certain disclosed techniques in accordance with certain embodiments of this disclosure. As with FIG. 2, here, data stored to clusters of NAS 102, which relies on separate permissions, is being migrated to more modern clusters of NAS 112, which relies on a unified permissions model. Authentication provider 116 comprises AD 108 with services 118 for Unix enabled. Thus, authentication provider 116 can authenticate both Windows-type and Unix-type clients.

Device 300 can perform the role of migration controller 202 or can be included in or operatively or communicatively coupled to migration controller 202, which can leverage SMB proxy 206. In this case, because the inheritance property associated with Windows-type authentication can be accounted for (e.g., at least in part due to the aforementioned directory tree parsing), permissions issues 208 can be mitigated or avoided, as indicated at reference numeral 402.

Example Methods

FIGS. 5-9 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Figure 5:
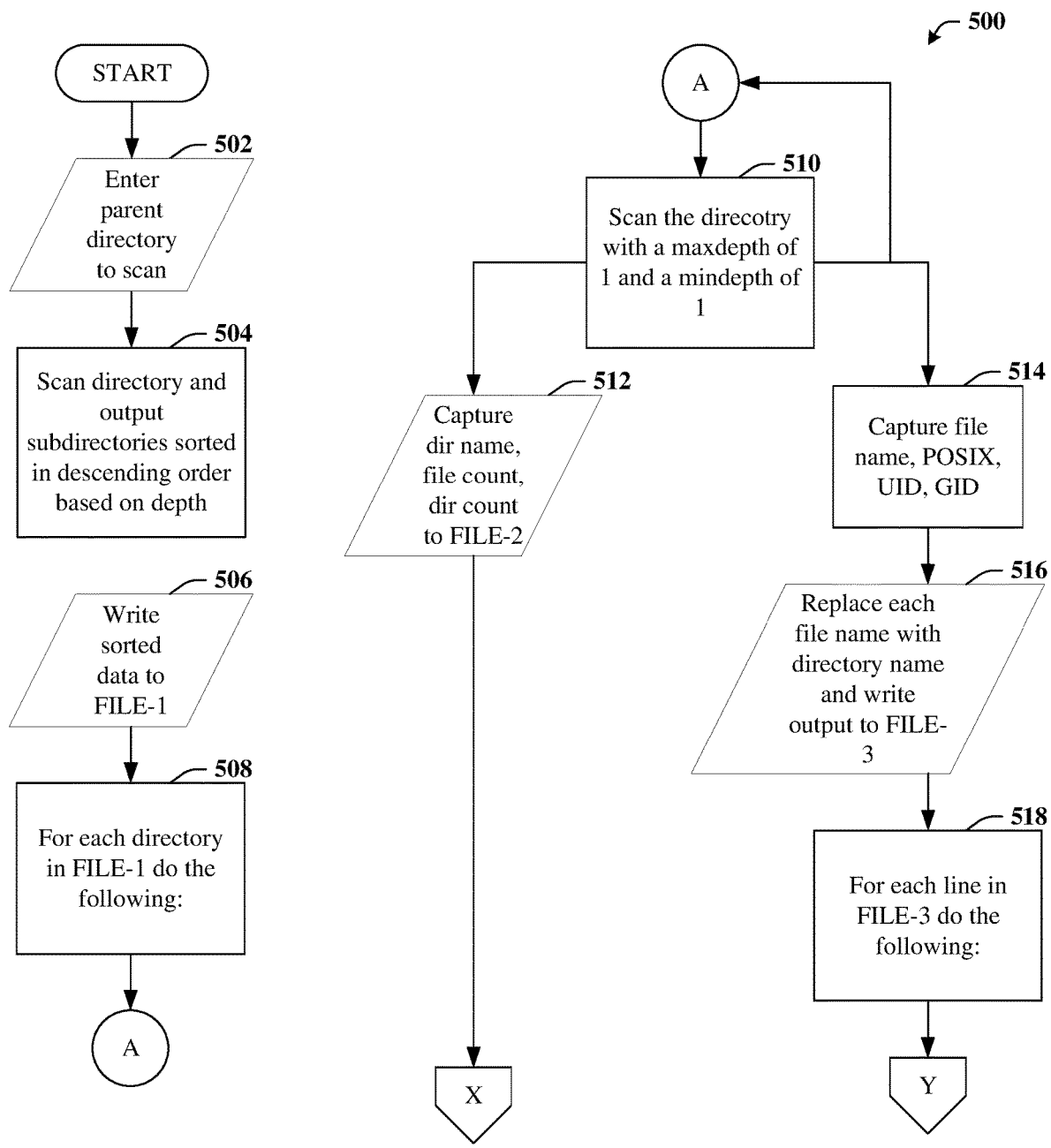
FIG. 5 depicts a flow diagram 500 illustrating a first portion of a detailed method to translate permissions in accordance with certain embodiments of this disclosure.
Figure 6:
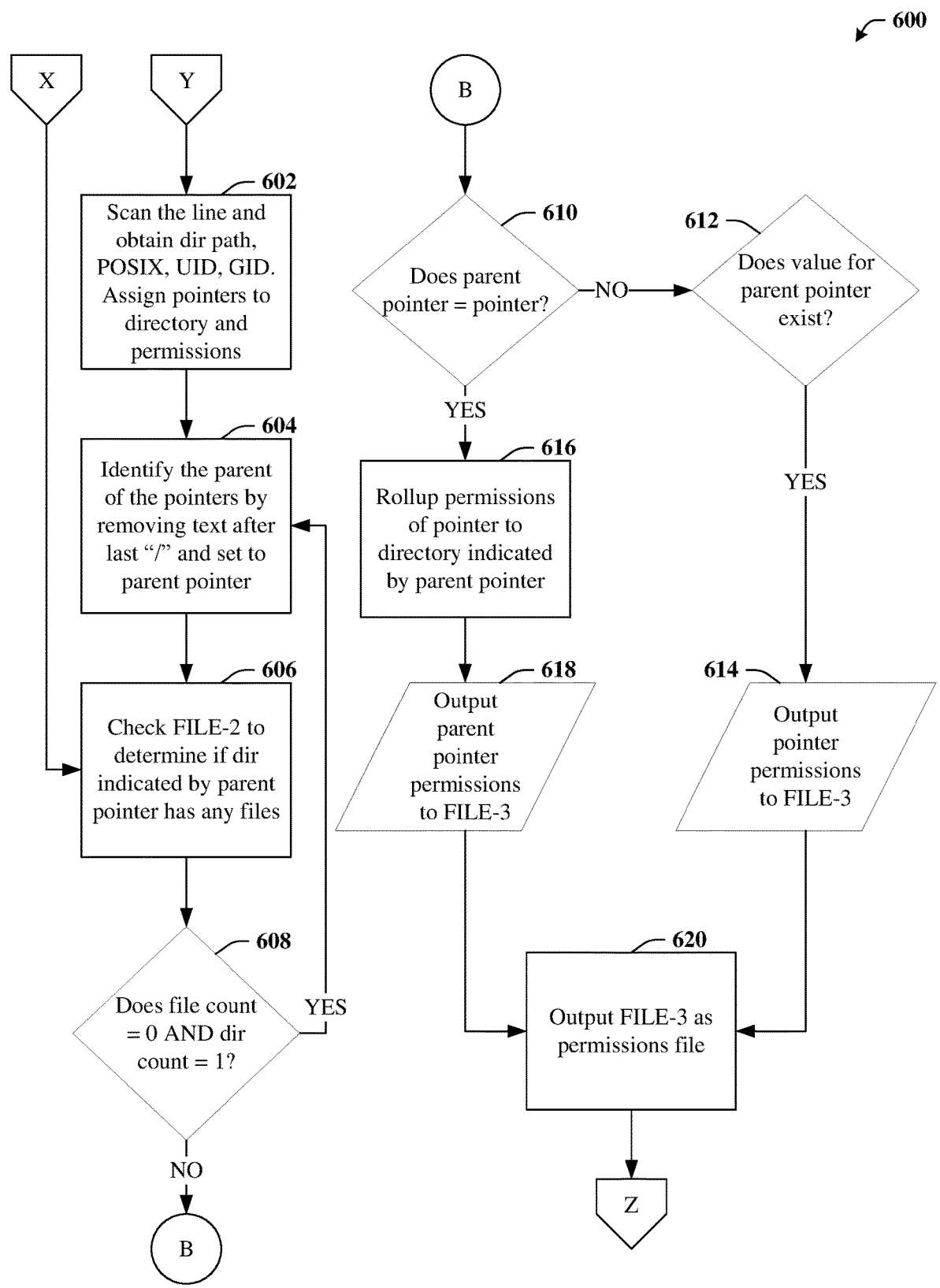
FIG. 6 depicts a flow diagram 600 illustrating a second portion of a detailed method to translate permissions in accordance with certain embodiments of this disclosure.
Figure 7:
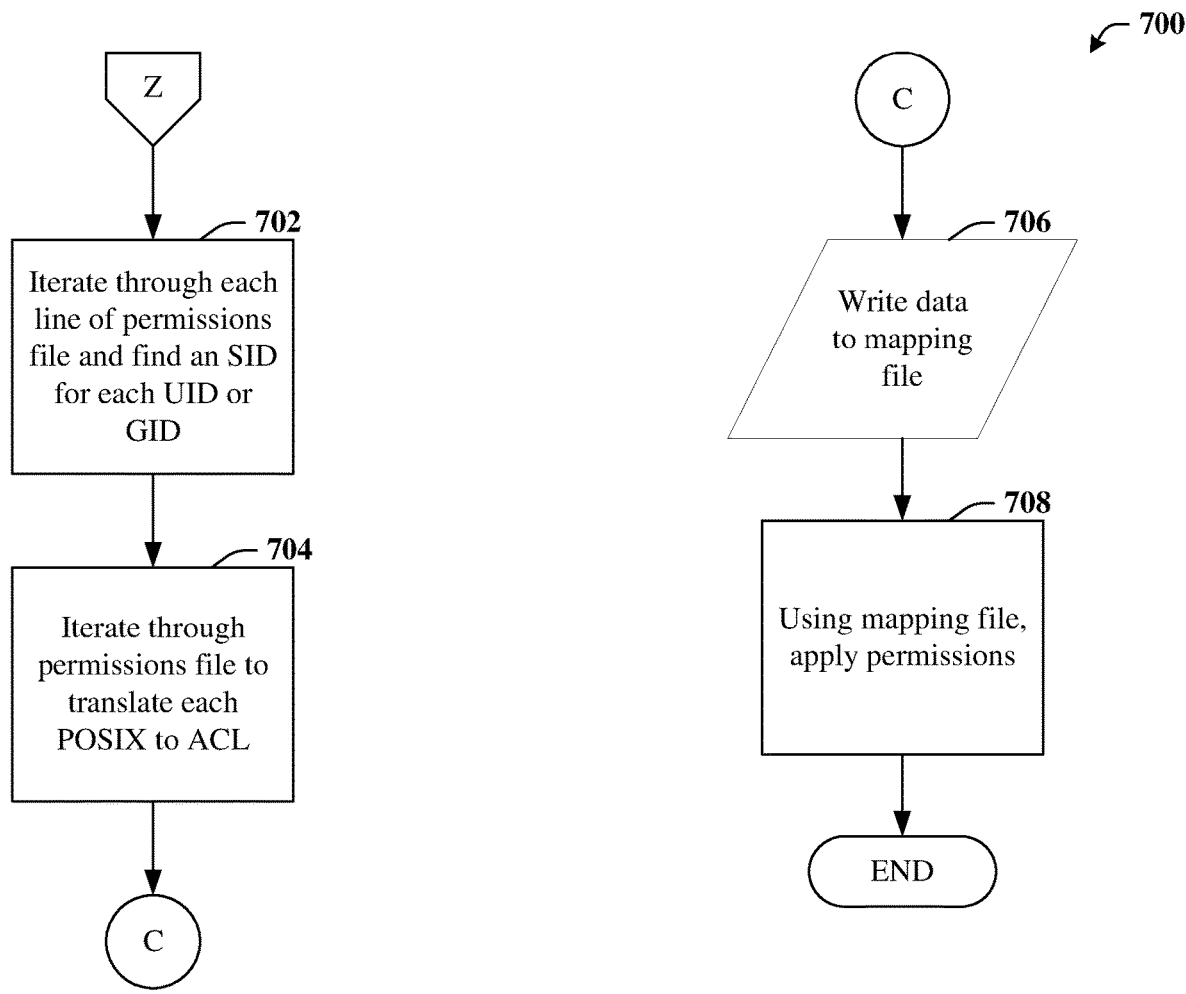
FIG. 7 depicts a flow diagram 700 illustrating a third portion of a detailed method to translate permissions in accordance with certain embodiments of this disclosure.

FIGS. 5-7 relate to a detailed method for translating permissions in a manner that avoids permissions issues 208 or other suitable issues. This method relies on techniques detailed above or otherwise herein such as exploring directory tree structure 314 of storage data 310 that is to be migrated and identifying one or more target directory 322 in order to leverage the inheritance property utilized by Windows-type systems. This method describes certain details and is intended to merely reflect one specific concrete solution or implementation, understanding that certain variations or changes can exist and should be considered within the scope of the disclosed subject matter Referring now to FIG. 5, a flow diagram 500 is depicted illustrating a first portion of a detailed method to translate permissions in accordance with certain embodiments of this disclosure. At data block 502, a device (e.g., device 300) can receive input that indicates a parent directory to be scanned and/or migrated. For example, such can be indicative a root directory or other parent directory. It is assumed that all child elements of the parent directory are to be migrated or otherwise processed.

At process block 504, the device can the parent directory can be scanned and an output can be generated. For example, this scanning can capture a directory name for the parent directory and all subdirectories as well as a depth from the parent directory. The generated output can indicate sorted in descending order. Continuing the example above in which a directory tree structure includes the path /root/A/a1/b1 and /root is indicated to be the parent directory, then one example output can be according to Table I below:

TABLE I

| DIRECTORY NAME | DEPTH |
| --- | --- |
| b1 | 3 |
| a1 | 2 |
| A | 1 |
| root | 0 |

At data block 506, this output such as Table I, which is sorted in descending order by depth can be stored to a file, such as FILE-1. At process block 508, additional parsing and/or scanning can be applied to directory in FILE-1, which can include elements indicated after following page reference A. For example, at process block 510, the device can scan the given directory with a maxdepth of 1 and a mindepth of 1 or in other words, only scan the current directory not parent or child directories. At data block 512, the device can capture information about any child element at the same depth such as directory name (e.g., names of any subdirectories of the currently processed directory), a file count, a directory count and so forth. Such can be accomplished by scanning the entries of FILE-1, for example, and this information can be output to FILE-2. The method can continue to reference X, which is further detailed in connection with FIG. 6.

Similarly, at process block 514, the device can scan each directory in FILE-1 and capture file name, posix ID, UID, GID for each file and capture directory name, posix ID, UID, GID for each directory. As an example, suppose /root/A is currently being processed (at a depth of 1 only) and further suppose that /root/A has three files contained in the directory and, of course, subdirectory /root/A/a1. In that case, the output can be as indicated in Table II, below, and which is further detailed below, particularly in connection with roll up procedures discussed below:

TABLE II

| NAME | POSIX | UID | GID |
| --- | --- | --- | --- |
| File1 | 774 | 5001 | 2000 |
| File2 | 665 | 5020 | 2000 |
| File3 | 774 | 5001 | 2000 |
| a1 | 600 | 1000 | 1001 |

At data block 516, the device can replace each instance of a file name with a directory name, perform some roll ups and/or remove duplicates with the same permissions and output the results to FILE-3. In other words, only the unique permissions need be retained and, here, File1 has the same permissions as File3. Results outputted to FILE-3 can be similar to that indicated in Table III.

TABLE III

| NAME | POSIX | UID | GID |
| --- | --- | --- | --- |
| A | 774 | 5001 | 2000 |
| A | 665 | 5020 | 2000 |
| A | 600 | 1000 | 1001 |

At process block 518, further processing can be performed on the data included in FILE-3 (e.g., Table III). For example, for each line of FILE-3, processing can occur by following reference Y, which is further detailed in connection with FIG. 6. It is noted that the above steps can be repeated until all directories in FILE-1 (e.g., Table I) are processed.

With reference now to FIG. 6, a flow diagram 600 is depicted illustrating a second portion of a detailed method to translate permissions in accordance with certain embodiments of this disclosure. At process block 602, the device can iteratively scan each line of FILE-3 to obtain a directory path, posix ID, UID, and GID. The device can then assign pointers to the directory and permissions pointer to corresponding permissions (e.g., posix ID, UID, GID). Such scanning can represent a scanning for inheritance using FILE-3 by iterating through each line of the file, recalling that each line of FILE-3 has a directory name, a posix ID, a UID, and a GID.

At process block 604, the device can identify a parent of the pointer, e.g., parent pointer. The parent pointer can be determined by obtaining the path and removing text after the last "/" in the path, as one example. Hence, if the directory being processed is /root/A/a1/, then pointer can=/root/A/a1 and the parent pointer can=/root/A/.

At process block 606, the device can determine whether the parent directory has any files. Such can be accomplished by whether the directory indicated by the parent pointer has files, which can be ascertained by looking at the file count value of FILE-2.

At decision block 608, the device can check whether file count=0 and dir count=1. If so, the method loops back to process block 604. If file count is not equal to 0 or dir count is not equal to 1, then the method proceeds to page reference B. At decision block 610, the device can check whether the parent pointer=the pointer. If not, then at decision block 610, it is determined whether the value of the parent pointer exists, and, if so, the method proceeds to data block 614 in which the device can output the pointer permissions to FILE-3.

From a previous branch, at process block 616, the device can roll up permissions of the pointer to the parent directory indicated by the parent pointer. Thereafter, at data block 618, the device can output the parent pointer permissions to FILE-3. Whether from data block 618 and/or data block 614, the method can proceed to process block 620, where FILE-3 can be output to a permissions file and the method can proceed to reference Z, which is further detailed in connection with FIG. 7.

It is appreciated that the various loops detailed above can be designed to check certain relevant conditions. For example, to check that the file count has a value. If the file count does not have a value, then that means that a grep on the file count of FILE-2 is empty. This can happen when the parent directory has a path which is a parent of the root directory. Another check is that the file count=0 and, if so, this implies the parent directory is empty. Still another check is that the directory count=1 and, if so, this implies that the parent directory contains only one other directory, which is the directory currently being scanned. For example, a while loop can continue traversing up the directory tree structure until a directory is found which is either the root directory or a directory that contains some files.

Turning now to FIG. 7, a flow diagram 700 is depicted illustrating a third portion of a detailed method to translate permissions in accordance with certain embodiments of this disclosure. At process block 702, the device can iterate through each line of the permissions file to find a corresponding SID for each UID or GID.

At process block 704, the device can iterate through the permissions file to translate each posix ID to a corresponding ACL. As one example, this translation from posix ID to the corresponding ACL can leverage data such as table IV or similar.

| VALUE | PERMISSION TYPE |
| --- | --- |
| 0 | None |
| 1 | Read and execute |
| 2 | Write |
| 3 | Execute and write |
| 4 | Read |
| 5 | Read and execute |
| 6 | Read and write |
| 7 | Modify |

Following page reference C, the method can proceed to data block 706. At data block 706, the device can write data to a mapping file. At process block 708, the device use the mapping file to apply permissions accordingly. As one example, data indicated in the mapping file can be input to a Windows-type command line utility such as Cacls or any suitable device to manipulate permissions. The method can then end.

Figure 8:
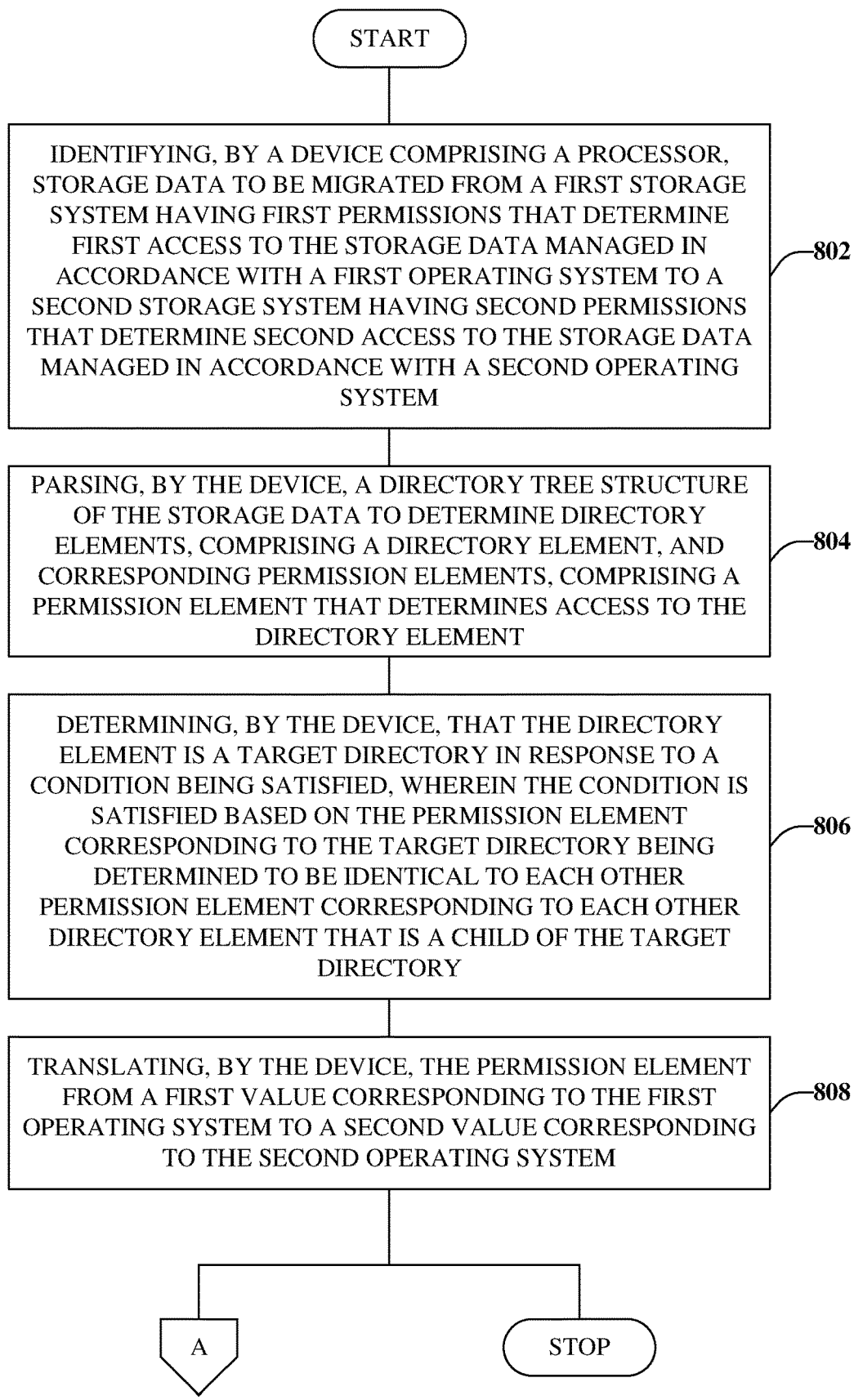
FIG. 8 illustrates an example method that can translate permissions from one storage system to another in accordance with certain embodiments of this disclosure.

Referring now to FIG. 8, exemplary method 800 is depicted. Method 800 can translate permissions from one storage system to another in accordance with certain embodiments of this disclosure. While method 800 describes a complete method, in some embodiments, method 800 can include one or more elements of method 900, as illustrated by insert A.

At reference numeral 802, a device comprising a processor can identify storage data to be migrated from a first storage system to a second storage system. The first storage system can have first permissions that determine first access to the storage data managed in accordance with a first operating system. The second storage system can have second permissions that determine second access to the storage data managed in accordance with a second operating system.

At reference numeral 804, the device can parse a directory tree structure of the storage data. This parsing can be employed to determine various directory elements, comprising a directory element, and corresponding permission elements, comprising a permission element that determines access to the directory element. Directory elements can include directories or files and each directory element can have one or more corresponding permissions elements such as a posix ID. UID, GID, and so forth.

At reference numeral 806, the device can determine that the directory element is a target directory in response to a condition being satisfied. The condition can be determined to be satisfied based on the permission element corresponding to the target directory being determined to be identical to each other permission element corresponding to each other directory element that is a child of the target directory. In other words, the condition can be satisfied if all child elements share the same permissions as the target directory.

At reference numeral 808, the device can translate the permission element from a first value corresponding to the first operating system to a second value corresponding to the second operating system. For instance, a Unix-based posix ID can be translated to a Windows-based ACL and any UID or GID can be translated to an SID. Method 800 can terminate or continue to insert A, which is further detailed in connection with FIG. 9.

Figure 9:
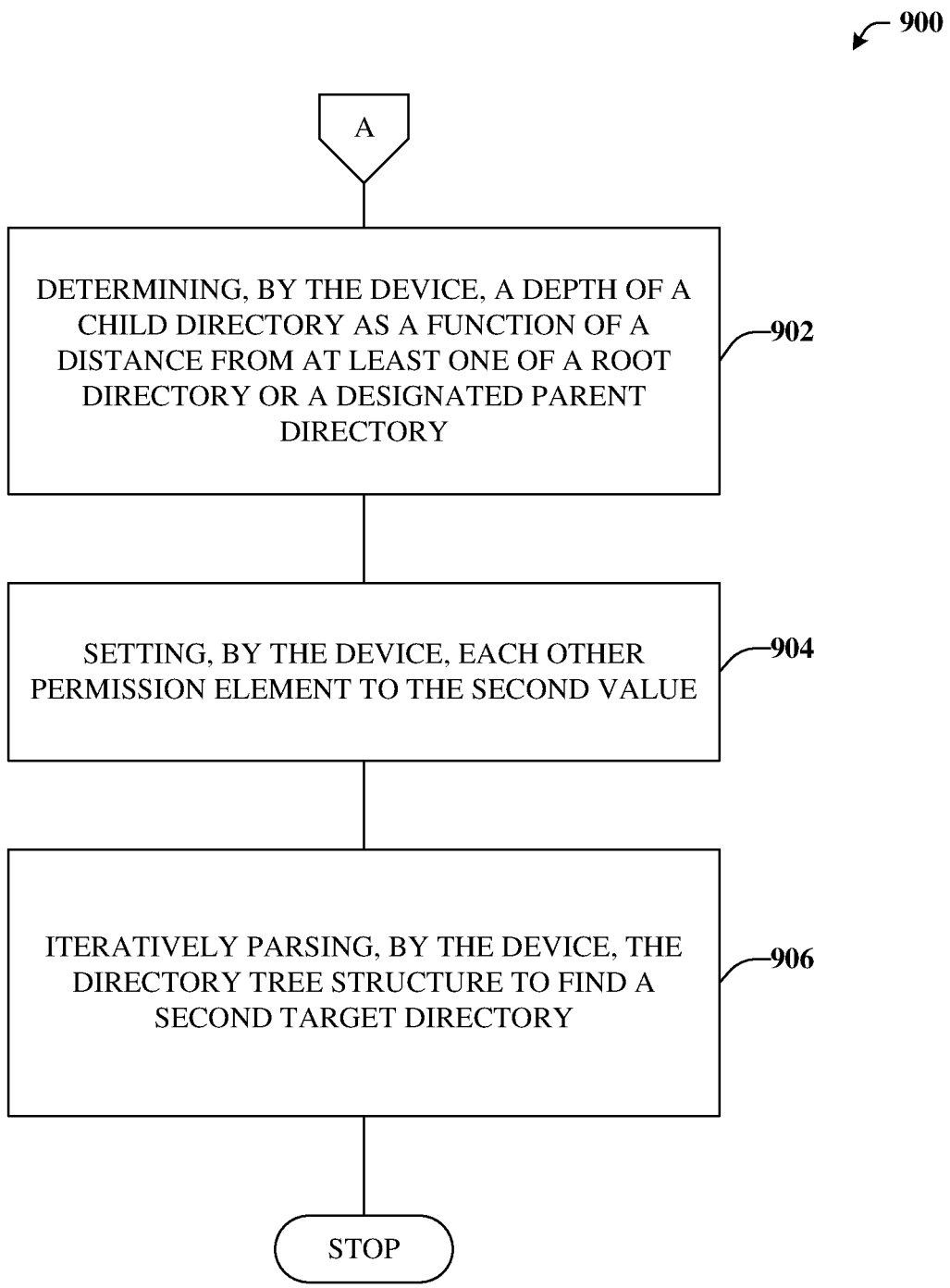
FIG. 9 illustrates an example method that can provide for additional aspect or elements in connection with translating permissions from one storage system to another in accordance with certain embodiments of this disclosure.

Turning now to FIG. 9, exemplary method 900 is depicted. Method 900 can provide for additional aspect or elements in connection with translating permissions from one storage system to another in accordance with certain embodiments of this disclosure.

At reference numeral 902, the device introduced at reference numeral 802 comprising a processor can determine a depth of a child directory. The depth can be determined as a function of a distance from at least one of a root directory or a designated parent directory.

At reference numeral 904, the device can set each other permission element to the second value. Thus, each other permission element that is a child of the target directory can be set to the second value.

At reference numeral 906, the device can iteratively parse the directory tree structure to find a second target directory.

Example Operating Environments

Figure 10:
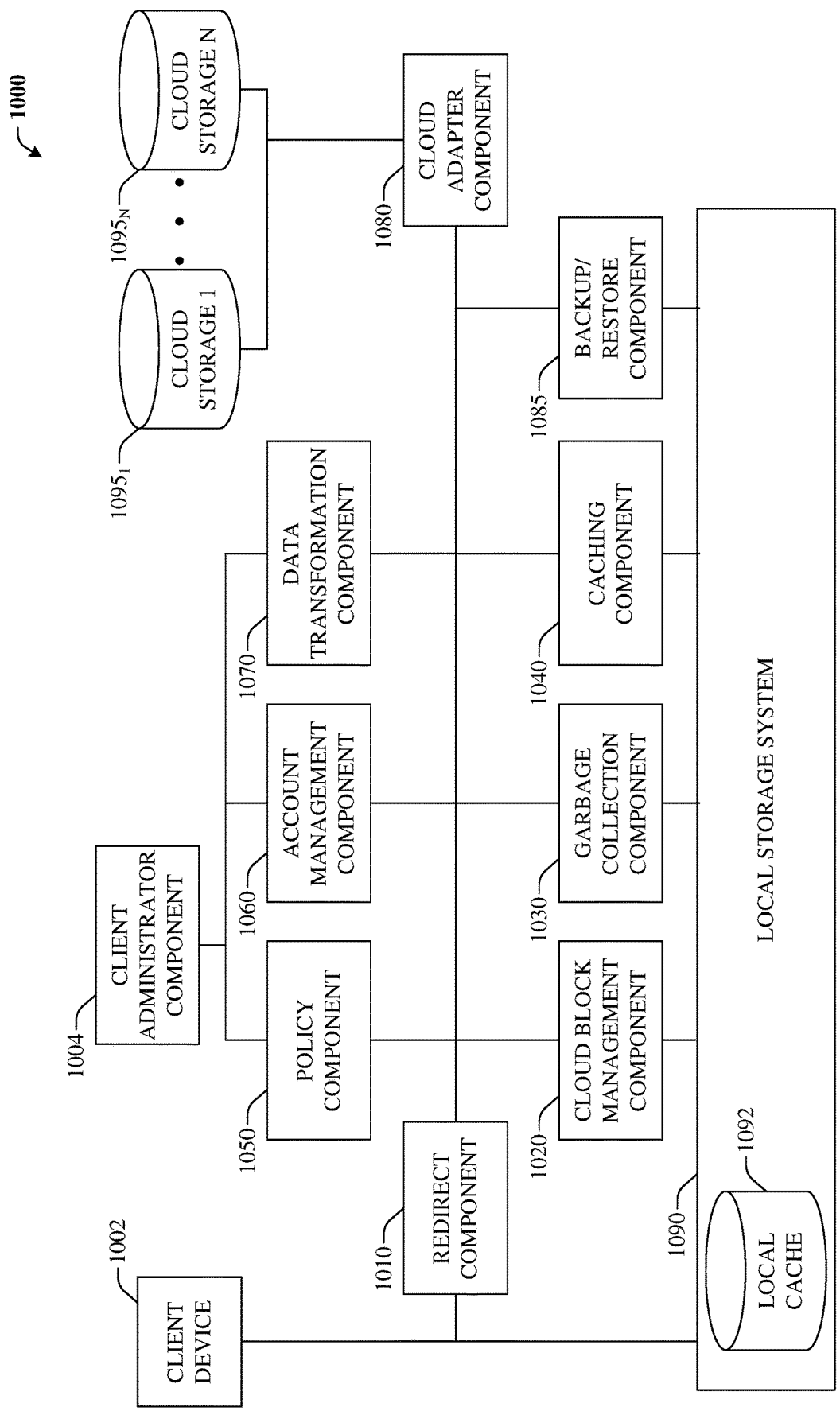
FIG. 10 illustrates a block diagram of an example distributed file storage system that employs tiered cloud storage in accordance with certain embodiments of this disclosure.
Figure 11:
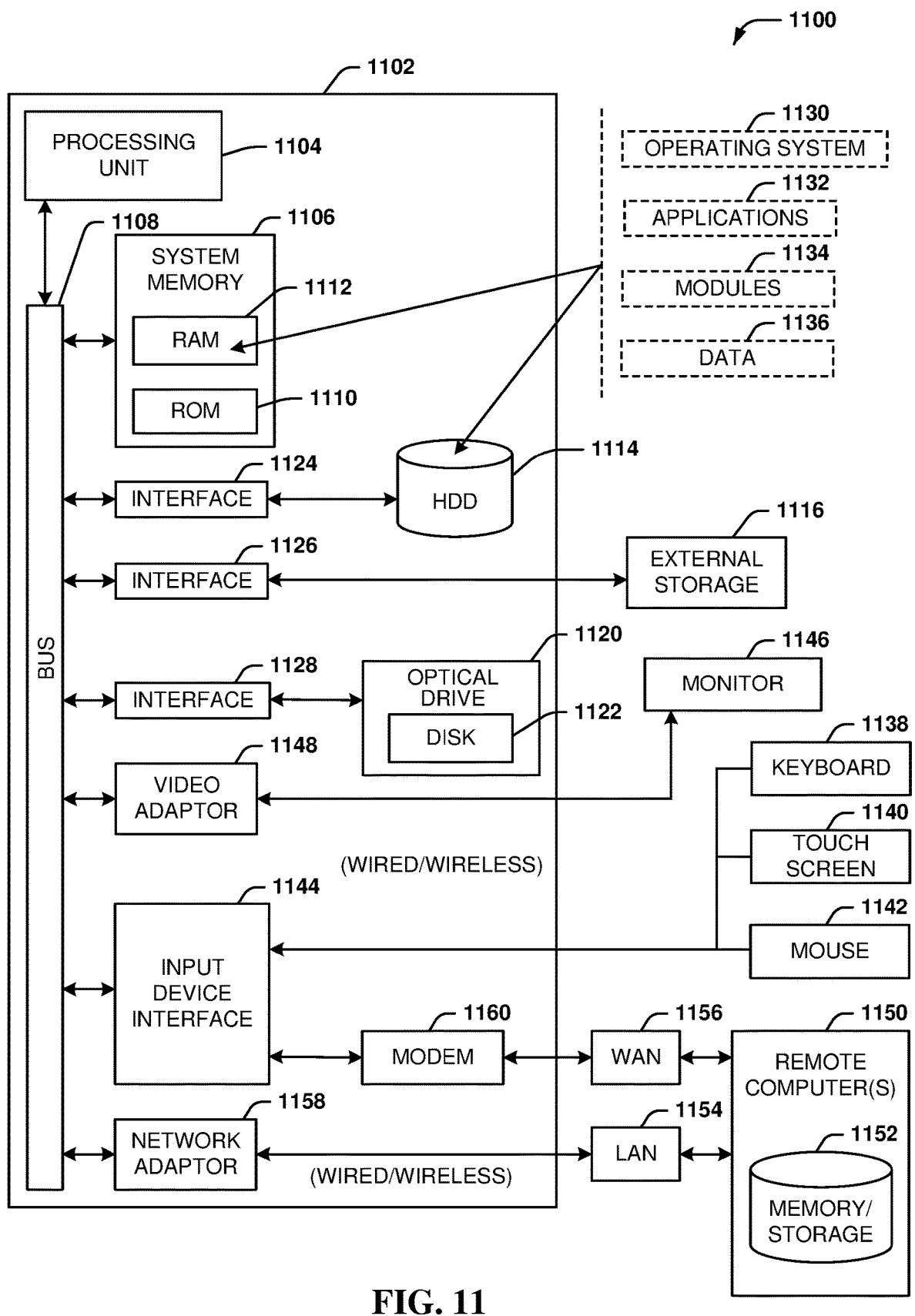
FIG. 11 illustrates an example block diagram of a computer operable to execute certain embodiments of this disclosure.

To provide further context for various aspects of the subject specification, FIGS. 10 and 11 illustrate, respectively, a block diagram of an example distributed file storage system 1000 that employs tiered cloud storage and block diagram of a computer 1102 operable to execute the disclosed storage architecture in accordance with aspects described herein.

Referring now to FIG. 10, there is illustrated an example local storage system including cloud tiering components and a cloud storage location in accordance with implementations of this disclosure. Client device 1002 can access local storage system 1090. Local storage system 1090 can be a node and cluster storage system such as an EMC Isilon Cluster that operates under OneFS operating system. Local storage system 1090 can also store the local cache 1092 for access by other components. It can be appreciated that the systems and methods described herein can run in tandem with other local storage systems as well.

As more fully described below with respect to redirect component 1010, redirect component 1010 can intercept operations directed to stub files. Cloud block management component 1020, garbage collection component 1030, and caching component 1040 may also be in communication with local storage system 1090 directly as depicted in FIG. 10 or through redirect component 1010. A client administrator component 1004 may use an interface to access the policy component 1050 and the account management component 1060 for operations as more fully described below with respect to these components. Data transformation component 1070 can operate to provide encryption and compression to files tiered to cloud storage. Cloud adapter component 1080 can be in communication with cloud storage 1 $1095_1$ and cloud storage N $1095_N$, where N is a positive integer. It can be appreciated that multiple cloud storage locations can be used for storage including multiple accounts within a single cloud storage location as more fully described in implementations of this disclosure. Further, a backup/restore component 1085 can be utilized to back up the files stored within the local storage system 1090.

Cloud block management component 1020 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1020 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1060 manages the information for cloud storage accounts. Account information can be populated manually via a user interface provided to a user or administrator of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1020 based on list of mappings it manages. For example, each stub can be associated with an account, and the cloud block management component 1020 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 1080 manages the sending and receiving of data to and from the cloud service providers. The cloud adapter component 1080 can utilize a set of APIs. For example, each cloud service provider may have provider specific API to interact with the provider.

A policy component 1050 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1030. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1030 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 1040 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1020, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1040 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 1040 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1070 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 1085 can transfer a copy of the files within the local storage system 1090 to another cluster (e.g., target cluster). Further, the backup/restore component 1085 can manage synchronization between the local storage system 1090 and the other cluster, such that, the other cluster is timely updated with new and/or modified content within the local storage system 1090.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1102.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
a processor; and
a memory that stores executable instructions that, when executed by the processor, facilitate performance of operations, comprising:
  identifying storage data to be migrated from a first storage system to a second storage system, wherein the first storage system uses first permissions that determine first access to the storage data managed on the first storage system in accordance with a first operating system that utilizes a network file system permissions protocol, and wherein the second storage system uses second permissions that determine second access to the storage data managed on the second storage system in accordance with a second operating system that utilizes a server message block permissions protocol;
  translating the first permissions to the second permissions, the translating comprising:
    parsing a directory tree structure of the storage data stored on the first storage system to determine directory elements and corresponding permission elements, wherein the directory elements comprise a directory element, and wherein the corresponding permission elements comprise a permission element that determines access permissions to the directory element; and
    determining that the directory element is a target directory in response to a condition being satisfied, wherein the condition is satisfied in response to all child directory elements having respective permission elements that are identical to the permission element corresponding to the directory element, and wherein all child directory elements are children of the directory element.

2. The device of claim 1, wherein the first operating system is a UNIX-type operating system and the second operating system is a Windows-type operating system.

3. The device of claim 1, wherein the directory element comprises at least one of: a root directory, a parent directory, a child directory, or a file.

4. The device of claim 3, wherein the target directory is a first parent directory, and wherein the child of the target directory comprises at least one of a first child directory or a first file.

5. The device of claim 1, wherein the target directory is a top-most directory, within the directory tree structure, in which the condition is satisfied.

6. The device of claim 1, wherein permission for the directory element is represented by at least one of a user identifier value, a group identifier value, or a portable operating system interface value.

7. The device of claim 6, wherein permission for the directory element is represented by the user identifier value that is translated by the translating to a security identifier.

8. The device of claim 6, wherein permission for the directory element is represented by the group identifier value that is translated by the translating to a security identifier.

9. The device of claim 6, wherein permission for the directory element is represented by the portable operating system interface value that is translated by the translating to an access control list.

10. The device of claim 1, wherein the parsing the directory tree structure comprises determining a depth of a child directory as a function of a distance from at least one of a root directory or a designated parent directory.

11. The device of claim 1, wherein the translating further comprises translating the permission element corresponding to the target directory and setting each one of the respective permission elements of the child directory elements on the second storage system to be identical to the permission element.

12. The device of claim 1, wherein the target directory is a first target directory, and wherein the translating further comprises iteratively parsing the directory tree structure to locate a second target directory.

13. A non-transitory computer-readable medium comprising instructions that, in response to execution, cause a system comprising a processor to perform operations, comprising:
identifying storage data to be migrated from a first storage system to a second storage system, wherein the first storage system relies on multiple authentication providers to manage first permissions separately by selecting one of the multiple authentication providers as a function of use of a particular operating system protocol from among different operating system protocols, and wherein the second storage system manages second permissions according to a unified process that relies on a single authentication provider;
performing a permissions translation procedure that translates the first permissions to the second permissions, the permissions translation procedure comprising:
parsing a directory tree structure of the storage data stored on the first storage system to determine directory elements and corresponding permission elements, wherein the directory elements comprise a directory element, and wherein the corresponding permission elements comprise a permission element that determines access permissions to the directory element; and
determining that the directory element is a target directory in response to a condition being satisfied, wherein the condition is satisfied when each respective child directory element has a respective permission element that is identical to the permission element corresponding to the directory element, and wherein each respective child directory element is a child of the directory element.

14. The non-transitory computer-readable medium of claim 13, wherein the target directory is a top-most directory, within the directory tree structure, in which the condition is satisfied.

15. The non-transitory computer-readable medium of claim 13, wherein permission represented by the permission element corresponding to the directory element is represented by a user identifier value or a group identifier value translated by the permissions translation procedure to one or more security identifiers.

16. The non-transitory computer-readable medium of claim 13, wherein permission represented by the permission element corresponding to the directory element is represented by a portable operating system interface value that is translated by the permissions translation procedure to an access control list.

17. A method, comprising:
identifying, by a device comprising a processor, storage data to be migrated from a first storage system, wherein the first storage system uses first permissions that determine first access to the storage data managed in accordance with a first operating system that utilizes a network file system permissions protocol to a second storage system having second permissions that determine second access to the storage data managed in accordance with a second operating system that utilizes a server message block permissions protocol;
parsing, by the device, a directory tree structure of the storage data stored on the first storage system to determine directory elements and corresponding permission elements, wherein the directory elements comprise a directory element, and wherein the corresponding permission elements comprise a permission element that determines access permissions to the directory element;
determining, by the device, that the directory element is a target directory in response to a condition being satisfied, wherein the condition is satisfied based on each respective child directory having a respective permission element determined to be identical to the permission element corresponding to the directory element, and wherein each respective child directory is a child of the directory element; and
translating, by the device, the permission element from a first value corresponding to the first operating system to a second value corresponding to the second operating system.

18. The method of claim 17, further comprising determining, by the device, a depth of a child directory as a function of a distance from at least one of a root directory or a designated parent directory, wherein the child directory is one of the each respective child directory.

19. The method of claim 17, further comprising setting, by the device, each respective permission element to the second value on the second storage system.

20. The method of claim 17, wherein the target directory is a first target directory, and further comprising iteratively parsing, by the device, the directory tree structure to find a second target directory.

\* \* \* \* \*